Figure 1:
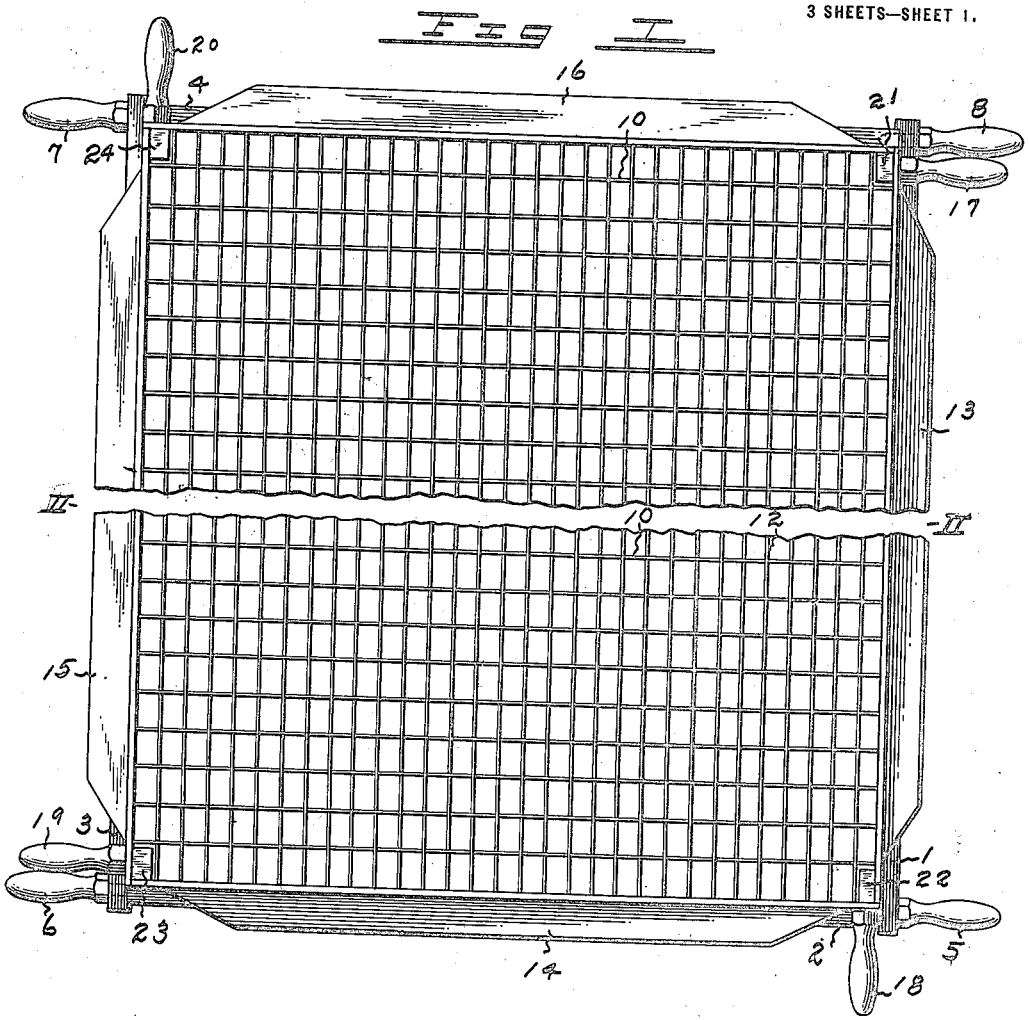

S. H. BORN.
CANDY MAKING MACHINERY.
APPLICATION FILED APR. 14, 1915.

1,195,437.

Patented Aug. 22, 1916.
3 SHEETS—SHEET 1.

S. H. BORN.
CANDY MAKING MACHINERY.
APPLICATION FILED APR. 14, 1915.
1,195,437.
Patented Aug. 22, 1916.
3 SHEETS—SHEET 2.
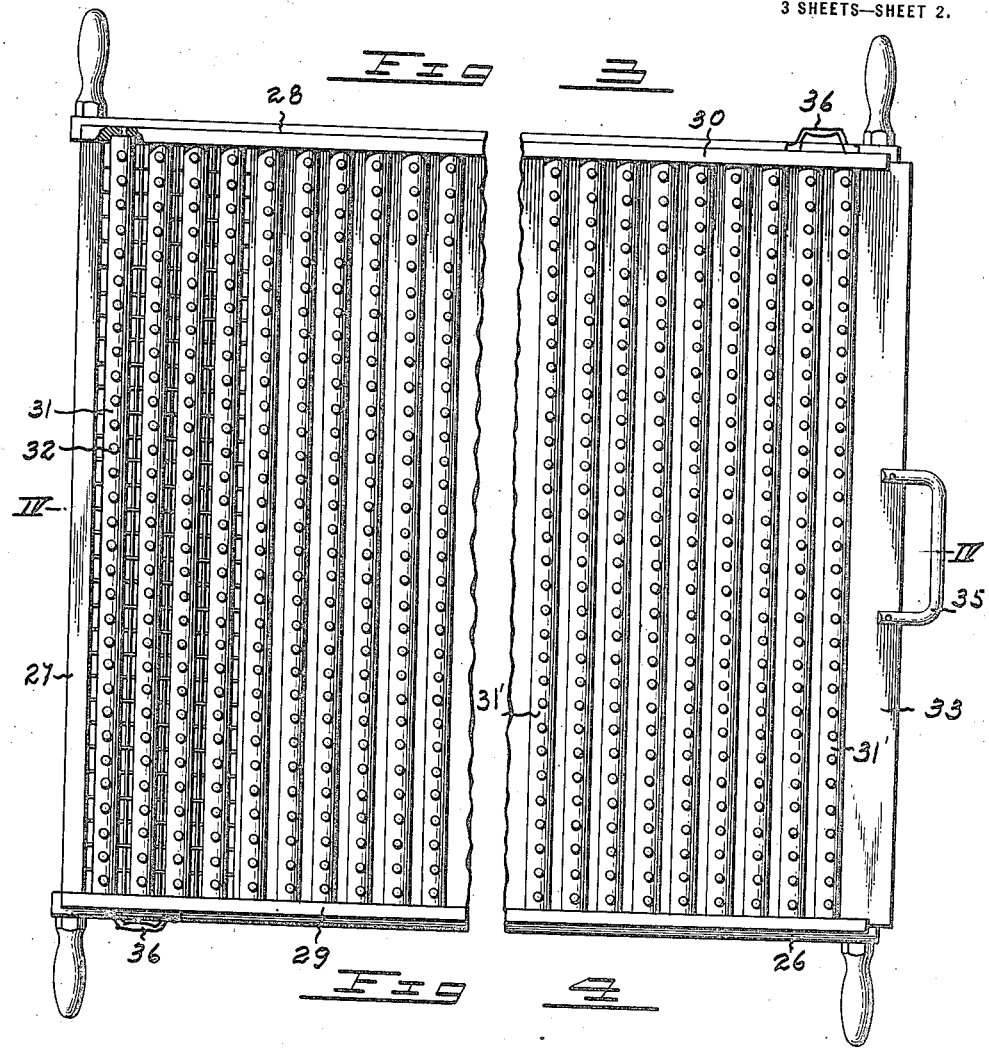
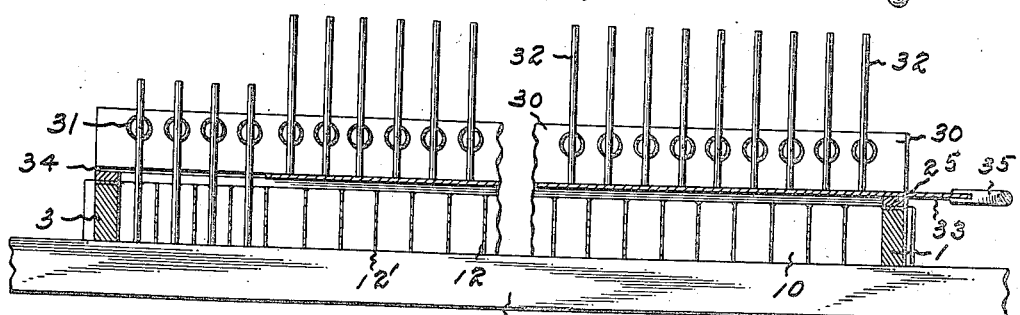
WITNESSES:
INVENTOR.
BY
ATTORNEY.

S. H. BORN.
CANDY MAKING MACHINERY.
APPLICATION FILED APR. 14, 1915.

1,195,437.

Patented Aug. 22, 1916.
3 SHEETS—SHEET 3.

WITNESSES:

INVENTOR.
BY
ATTORNEY.

UNITED STATES PATENT OFFICE.

SAMUEL H. BORN, OF SAN FRANCISCO, CALIFORNIA, ASSIGNOR TO PHILIP J. JACOBY, SAMUEL JACOBY, AND ISRAEL F. MORRIS, DOING BUSINESS UNDER THE FIRM-NAME OF MORRIS MERCANTILE COMPANY, OF SAN FRANCISCO, CALIFORNIA.

CANDY-MAKING MACHINERY.

1,195,437.     Specification of Letters Patent.     Patented Aug. 22, 1916.

Application filed April 14, 1915. Serial No. 21,243.

*To all whom it may concern:*

Be it known that I, SAMUEL H. BORN, a subject of the Czar of Russia, having declared my intention of becoming a citizen of the United States, residing in the city and county of San Francisco, State of California, (whose post-office address is 1280 Turk street,) have invented new and useful Improvements in Candy-Making Machinery, of which the following is a specification.

This invention relates more particularly to machinery for and the method of molding candy into portions having a stick embedded therein and colloquially known as "All Day Suckers."

Among the objects of my invention are:—To provide means for producing candy of the nature described, in relatively large quantities with the minimum of labor; to produce an apparatus simple in construction that will produce candy novelties of the nature described, that is sanitary, economical and simple in operation; to provide a method of operation obtaining the maximum efficiency; and that will produce units of the products described that are uniform in size, appearance, quality, etc.

Other objects and advantages will appear as the description progresses.

In the drawing accompanying and forming part of the present specification, to which like reference characters have been applied, a simple form of putting this invention into practice is shown. I do not wish to be understood as confining this invention to the disclosures made in said drawing and description, as many variations may be introduced, within the spirit of this invention, as defined in the claims succeeding the said description.

It has been common practice heretofore in the production of such candy novelties, to mold the desired quantity of candy individually into the proper shape then insert a skewer to form a proper handle for manipulating the candy in the approved childish fashion. This practice is subject to many disadvantages: It is subject to criticism from a sanitary standpoint; it requires the use of a sharpened skewer, more expensive than the stick indicated in the present invention; the sharpened skewer is a source of danger to small children apt to run and play with it in their mouths; and such a method is inefficient, adding unduly to the cost of production. The advantages of the present means and method will be manifest as the description progresses.

Figure 2:
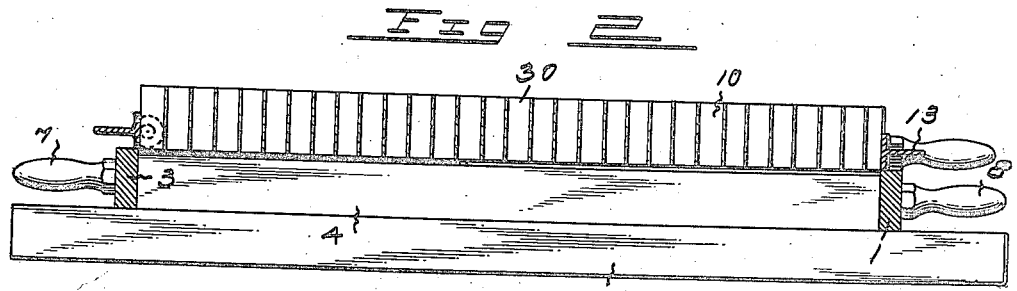
Figure 5:
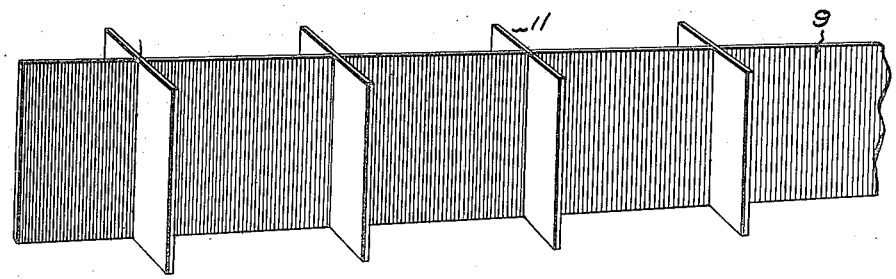
Figure 6:
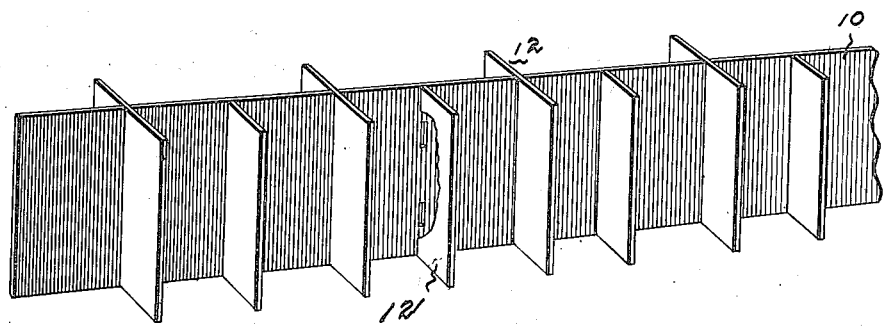
Figure 7:
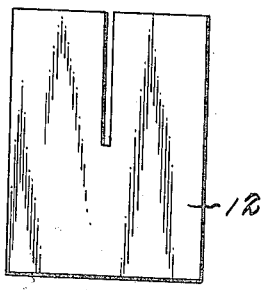
Figure 8:
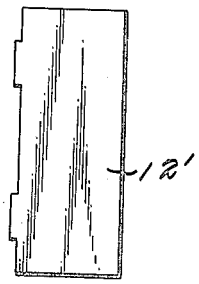

In the three sheets of drawings:—Figure 1 is a plan view from above of the molding apparatus forming part of this invention, the stick placing rack being omitted. Fig. 2 is a side elevation partially in cross section of the same showing the cellular mold in position to be lowered within the casting flask. Fig. 3 is a plan view from above of the same with the stick placing mechanism in position showing the stick support partially withdrawn. Fig. 4 is a side elevation of the same taken on the line IV—IV Fig. 3. Fig. 5 is an isometrical fragmentary detail of one of the dividing partitions of the cellular molds. Fig. 6 is a similar view of another form of dividing partition coöperating with the partition illustrated in Fig. 5. Fig. 7 is a plan view of one of the transverse vanes adapted to be assembled upon the partition as illustrated in Fig. 5. Fig. 8 is a similar view of a subdivision vane adapted to be assembled with the partition, as illustrated in broken section in Fig. 6.

In detail the construction illustrated in the drawings includes the casting flask composed of the side bars 1, 2, 3 and 4, arranged in the form of a square, with one end of each bar overlapping the end of the contiguous bar as illustrated in Fig. 1. The overlapping ends are provided with a hole to receive the threaded stems forming part of the handles 5, 6, 7 and 8, extending therethrough and threaded into the abutting ends of the contiguous side bars, to form a rigid rectangular framework when properly screwed together by the several handles described. The top and bottom edges of these side bars are finished to a flush surface adapted to lie on the block of marble X, to form a flask open at the top and adapted to receive the hot candy while in a liquid state.

Certain candy recipes may require that the flask and the marble slab be warmed, to prevent a too quick cooling and setting of the candy before the operation can be completed. But warming of the various means in the method of operation are not essentially part of the invention.

The candy is poured into the flask to the desired height. The mold is composed of the dividing partitions 9 and 10 having the transverse vanes 11 and 12 assembled thereon and collectively assembled, as illustrated in Figs. 1 and 2, within the molding frame composed of the side bars 13, 14, 15 and 16, joined at the four corners by the handles 17, 18, 19 and 20, having threaded stems screwed into the blocks 21, 22, 23 and 24 respectively fixed on the several side bars, to form a rectangular frame the side dimensions of which are equal to the inside dimensions of the flask previously described, on the top of which they are adapted to rest to bring the outside dimensions of the cellular mold to vertical alinement with the inside of the flask frame. Thus assembled over the flask the side bars 13, 14, 15 and 16 are removed by unscrewing the handles 17, 18, 19 and 20 therefrom, permitting the cellulated mold to sink into the liquid candy confined in the flask, dividing the candy into multiple equal divisions according to the divisions of the mold. (See Fig. 4.) With the candy thus divided into the desired number of portions by the mold, the stick placing rack illustrated in Figs. 3 and 4 is placed over the flask, its frame resting upon the side bars thereof, with which it is alined. This rack is composed of the side bars 25, 26, 27 and 28 permanently assembled together to form a rigid rectangular frame; the side bars 26 and 28 having the upstanding flanges 29 and 30 to which the opposite ends of tubular transverse stick holders 31 are rigidly attached. These holders 31 are provided with vertical perforations coinciding with the underlying divisions of the cellulated mold above which they hold the sticks 32 in vertical alinement. The lower ends of the sticks 32 rest upon the sliding apron 33, sliding in grooves 34 formed on opposite sides in the flanges 29 and 30. When this apron 33 is withdrawn by means of the handle 35, the sticks 32 drop upon the still liquid candy confined in the cellular mold, into which they descend by gravity, which may be aided by pressure from above if the candy has begun to set. The rectangular frame of the rack is centered upon and held into position above the flask, by engagement with the lateral edges of the mold that protrudes slightly above the side bars of the flask and engages the inner surface of the side bars of the rack. After the withdrawal of the apron 33, the process may be expedited by turning a fan blast upon the assembled molds to hasten the cooling and hardening of the candy confined therein.

The assemblage of the various molding means is not disturbed until the candy has thoroughly set and permanently engages the sticks 32 embedded therein.

The candy is removed from the mold by lifting off the rack by means of the convenient handles 36 attached thereto, leaving the sticks 32 embedded in the candy. The handles 5, 6, 7, and 8 are then unscrewed, disassembling the side bars 1, 2, 3, and 4 forming the flask, that is completely removed from the mass of candy. The individual portions of candy are separated by disassembling the various elements forming the cellulated mold, each portion of candy emerging with its individual stick 32 permanently embedded therein. Each individual portion of candy may be wrapped in tissue paper or otherwise packed and is ready for trade distribution.

The various elements of the molds are formed of the materials best adapted to the purpose, metal being preferred, as it can be properly tinned or treated to conform to sanitary regulations and other conditions.

The cellulated mold is preferably formed as illustrated in Figs. 5 to 8. The partitions 9 and 10 are transversely slotted one-half their width, to receive the transverse vanes 11 and 12 similarly slotted longitudinally to form equal divisions on opposite sides of the partitions 9 and 10. These transverse vanes are so spaced from the ends of the partitions that the vanes 11 on the partition 9 will assemble between the vanes 12 on the partitions 10. The lateral vanes 12' are riveted to the outer surfaces only of the partitions 10, to divide the space between the vanes 12 abutting the adjacent side bar of the flask. By this construction the whole area of the flask is divided into rectangular spaces of equal dimensions. It is obvious however that the mold may be otherwise formed without departing from the spirit of this invention; and that the flask need not be square as shown but may be given any desired shape.

Having thus described this invention what I claim and desire to secure by Letters Patent is:—

1. A cellulated candy mold; means for supporting above and releasing sticks in alinement with the cells in said mold.

2. A cellulated candy mold; means for holding sticks in alinement above the cells in said mold; and a slidable apron beneath said stick holding means.

3. A candy machine including a molding flask; a cellulated mold within said flask; a stick rack above said flask having stick holding means coinciding with the cells of said mold; and an apron between said rack and said frame.

4. A candy machine including a molding flask; a cellulated mold within said flask; a rack above said flask and having stick holders coinciding with the cells of said mold and an apron slidable between said stick holders and said mold.

In testimony whereof, I have hereunto set my hand this 24th day of February, 1915.

SAMUEL H. BORN.

Witnesses:
 BALDWIN VALE,
 H. A. BULLARD.